Patented June 23, 1936

2,045,517

UNITED STATES PATENT OFFICE 2,045,517

WATER-SOLUBLE PHENOLIC DERIVATIVES

Herman A. Bruson, Elkins Park, and Otto Stein, Lansdowne, Pa., assignors to Rohm & Haas Company, Philadelphia, Pa.

No Drawing. Application February 13, 1935, Serial No. 6,386

20 Claims. (Cl. 260—130)

This invention relates to new phenols which are soluble in water and adapted primarily for use as soaps, wetting, emulsifying, dispersing, tanning, and germicidal agents, and to a process for producing same.

According to this invention, new and useful compounds of the above character are obtained by the condensation of alcohols containing a primary alcoholic group, with the hydrohalide or sulfate salts of the complex phenolic bases which are obtained by the interaction of phenols with at least molecular equivalent quantities each of formaldehyde and secondary aliphatic or alicyclic amines.

The condensation of the alcohol with the salt of the complex phenolic amine base takes place readily upon heating the mixture at from about 80° to 200° C. under ordinary atmospheric pressure. The condensation is advantageously carried out in the presence of an inert, volatile, organic liquid which boils within the above temperature range and which can subsequently be removed by distillation. Suitable liquids for the purpose are toluene, xylene, dioxane, and solvent naphtha. During the condensation, water is split off.

In the preferred form of this invention, the alcohols used are aliphatic, monohydric, primary alcohols containing at least eight carbon atoms; advantageously, 12 carbon atoms in the chain, if the more useful phenolic detergents which are one of the objects of this invention, are to be obtained. If the complex phenolic bases employed contain long alkyl side chains in the aromatic nucleus, as for example, in the case of the butyl, amyl, hexyl, octyl, lauryl, or cetyl phenols or the corresponding cresols or resorcinols, the alcohols used can be selected with chains shorter than 8 carbon atoms, so as to produce useful bactericidal soaps. It is to be understood therefore, that for the purpose of producing water-soluble compounds in general, the present process can be carried out with alcohols containing less or more carbon atoms than eight.

The alcohols used can be monohydric or polyhydric and may belong to the aliphatic, aromatic, hydro-aromatic, heterocyclic or alicyclic series. They may contain in addition, —S—, —O—, C=O, in their molecule. For practical purposes, however, the higher aliphatic primary alcohols such as n-octyl, lauryl, cetyl, alpha-ethyl-hexyl, oleyl, or octadecyl alcohols are advantageously used; or polyhydric alcohols such as 1,10-decamethylene glycol, and 1,12-octadecandiol. Mixtures of the above alcohols as obtained synthetically from the high temperature-high pressure hydrogenation of fatty glycerides or of fatty acid esters may be used, such for example, as the alcohols obtained from the reduction of the acids from cocoanut oil, palm oil, tallow, castor oil and the like, or the alcohols obtained from other natural fats or waxes such as spermaceti, bees' wax and wool grease.

Among the other alcohols which can be used there may be mentioned n-butyl alcohol, n-propyl alcohol, ethylene glycol, glycerol, trimethylene glycol, diethylene glycol, triethylene glycol, glycol-mono-ethyl ether (known as "Cellosolve"), iso-amyl alcohol, pentaerithrite, mannitol, phenoxyethanol, tetrahydro furfuryl alcohol, diethylene glycol-mono-butyl ether (known as "Carbitol"), and phenylethyl alcohol.

The alcohol and the complex phenolic amine salt of the type described herein are employed for the condensation, in proportions which will allow substantially all of the primary alcohol to be chemically combined with the salt of the phenolic base. These proportions correspond substantially to one primary alcoholic hydroxyl group for one reactive nitrogen atom in the complex phenolic amine salt. Where the complex phenolic amine salt contains two reactive nitrogen atoms, one may employ one or two mol equivalents of a primary monohydric alcohol, or one mol equivalent of a primary dihydric alcohol. As a rule any secondary or tertiary alcoholic groups which may be present in the primary alcohols used, do not condense, but split off water to form an unsaturated bond.

The complex phenolic base which serves as the intermediate for the preparation of these new soaps, is obtained by condensing any phenol (or fusible, soluble "Novolack" type phenolic-formaldehyde resin) having a replaceable nuclear hydrogen atom and which contains no free acidity or acidic groups, with at least one molecular equivalent each of formaldehyde and an aliphatic or alicyclic secondary amine having the formula X—NH—$X_1$ wherein X and $X_1$ are each alkyl or ring methylene groups. Such products are in some cases oils which can be distilled without appreciable decomposition in a high vacuum; others are amorphous balsams and cannot be distilled without decomposition. A few of them are crystalline. They are all phenols which combine with acids to form amine salts. For the purpose of this invention they are combined with hydrohalides such as hydrogen chloride or hydrogen bromide, or with sulfuric acid, to form the corresponding complex phenolic amine salts. These salts are the raw materials employed in the present invention for the condensation with the alcohols mentioned herein.

The products obtained by the condensation of reacting proportions of the alcohol with these hydrohalide or sulfate salts, are generally of a sticky, waxy to oily consistency. Some of them are definitely crystalline. They are all readily soluble in water.

By the present process a great variety of phenolic water-soluble compounds can be prepared the uses of which are in many cases dependent upon the nature of the groups or radicals present, which are in turn dependent upon the nature of the phenol, secondary amine, acid, and alcohol used, as shown in the examples.

Among the phenols which can be used for the purpose of obtaining the desired complex phenolic amines by the condensation with formaldehyde and the secondary amine, there may be mentioned the following:

Phenol, o-, m-, and p-cresol, 1,3,5-xylenol, any of the propyl, butyl, amyl, hexyl, heptyl, octyl, decyl, lauryl, or cetyl phenols or the corresponding cresols or resorcinols, o-, m-, or p-phenylphenol, benzylphenol, cyclohexylphenol, thymol, guaiacol, resorcinal, pyrocatechol, hydroquinone, alpha or beta-naphthol, bis-(p-hydroxydiphenyl)-dimethylmethane, and their nuclear halogen, alkyl, alkoxy, or acyl derivatives.

The secondary amines used can be dimethylamine, diethyl-amine, methyl ethylamine, dibutylamine, morpholine, piperazine, piperidine and the like.

Upon reacting the secondary amine, the phenol, and the formaldehyde together for 24 hours at room temperature or for several hours on the steam bath, alone, or in an inert solvent such as alcohol, the complex phenolic amine will usually separate as a sticky mass or sirup. Sometimes the product crystallizes. The phenolic amine after removal of unchanged starting materials is then converted into its hydrohalide or sulfate by reaction preferably with the dry gas or acid, and the substantially anhydrous salt thus obtained is heated with the alcohol until the product becomes soluble in water.

In view of the complex nature of the starting materials and the amorphous character of the products formed which are doubtless derivatives of polynuclear aromatic systems analogous to the "Novolack" type resins, it is not possible to state their exact chemical nature. It appears, however, that they are all phenols containing nitrogen together with the negative radicals of the alcohols and of the acids used. The products can in many cases, be coupled with diazotized aromatic amines to give dyestuffs.

In order to more clearly illustrate this invention, the following examples are given. In these examples, the designated complex condensation products of the phenols, formaldehyde, and secondary amine were prepared as follows:

*Condensate A.*—To a solution of 94 grams phenol (1 mol.) in 125 grams aqueous 36% commercial dimethylamine solution (1 mol.), 100 grams of aqueous 30% formaldehyde solution (1 mol.) was added dropwise while stirring and cooling to about 30° C. The mixture was allowed to stand 24 hours at room temperature (25° C.). The oil layer was then separated from the water layer, washed several times with water to remove traces of unreacted components, and distilled in vacuo. The pale yellow oil boiling at about 95-105° C./7-8 mm. was collected. It is soluble in either dilute sodium hydroxide solution or in dilute hydrochloric acid.

*Condensate B.*—198 grams ortho-cresol, 125 grams 35% dimethylamine solution, and 100 grams 30% formaldehyde solution were condensed as above. The product obtained was a pale yellow oil boiling at about 104° C./4 mm.

*Condensate C.*—From 1 mol. each of 1,3,5-xylenol, formaldehyde and dimethylamine, treated as above, the product obtained boiled at 135-145° C./12 mm. and crystalized in colorless plates melting at about 40° C.

*Condensate D.*—From 1 mol. each of para-chlorophenol, formaldehyde, and dimethylamine, treated as above, the product obtained was a pale yellow oil boiling at 145° C./17 mm.

*Condensate E.*—From 1 mol. each of $\alpha,\alpha,\gamma,\gamma$-tetramethyl-butyl-phenol, formaldehyde, and dimethylamine, in alcoholic solution. Product formed colorless crystals melting at 69° C.

*Condensate F.*—From 1 mol. each of $\alpha,\alpha,\gamma,\gamma$-tetramethyl-butyl-phenol, formaldehyde, and piperidine, in alcoholic solution. Product formed colorless crystals melting at 69° C.

*Condensate G.*—From 1 mol. each ortho-phenyl phenol, formaldehyde and dimethylamine, in alcoholic solution. Product formed colorless crystals melting at 112-113° C. The isomer prepared from para-phenyl-phenol melts at 90° C.

*Condensate H.*—From 1 mol. each of beta-naphthol, formaldehyde, and dimethylamine, in alcoholic solution; melting point 75° C.

*Condensate I.*—From 1 mol. each of bis-(p-hydroxy-diphenyl)-dimethyl methane, formaldehyde and diethylamine in alcoholic solution. Product was a sticky viscous mass.

*Condensate J.*—From 1 mol. each of phenol, formaldehyde and morpholin. Product—colorless crystals, melting point 95-96° C.

*Example 1.—Condensate "A" and lauryl alcohol*

38 grams condensate "A" were dissolved in 100 grams toluene in a flask fitted with a stirrer, dropping funnel, reflux condenser and automatic water separator; and gradually converted to its sulfate by adding slowly with cooling and stirring 25 grams 98% sulfuric acid so that the temperature did not exceed 40° C. The complex phenolic amine salt separated as a viscous oil. To the mixture, 46 grams technical lauryl alcohol (obtained from the hydrogenation of cocoanut oil) was added. The mixture was boiled for about 1½ hours while stirring continuously, during which time the water that formed was distilled off with some of the toluene, and the latter automatically returned to the flask, while the water was separated. When no more water came off, a clear colorless solution was obtained. The toluene was then removed by distillation under reduced pressure (50 mm.) on the steam bath. The residual product was a viscous, sticky, somewhat reddish oil. It was readily and completely soluble in cold water as well as in alcohol, or in benzene.

A 5% aqueous solution of the product was acidic and faintly opalescent and very foamy and soapy. It maintained its foamy soapy character in hard water or in acidic, neutral, or alkaline solution even on boiling, and may be used in either acid, alkaline or neutral solutions as a detergent, wetting, emulsifying or dispersing agent. In its acidic form it precipitates gelatine and may find use as a leather tanning agent.

*Condensate "A" and alpha-ethyl-n-hexanol.*—38 grams condensate "A" was converted to the complex phenolic amine sulfate with 25 grams 98% sulfuric acid in 100 grams toluene, and boiled for 1½ hours with 32.5 grams alpha-ethyl-n-hexanol, in the same manner as described above. Upon removing the toluene from the clear solution thus obtained, by evaporation under vacuum, the residual product formed a reddish, sticky, balsam-like material. It was exactly neutralized with dilute caustic soda. The clear pale solution thus obtained foams strongly when shaken. It is an excellent wetting-out agent for dyeing textiles.

*Condensate "A" and 1,10-decamethylene glycol.*—38 grams condensate "A" in 100 grams toluene was converted to the amine salt by means of 25 grams 98% sulfuric acid at 25–35° C. The mixture was boiled under reflux with 22 grams 1,10-decamethylene glycol for 1½ hours as described above. Two layers were formed on cooling. Upon removal of toluene under reduced pressure on steam bath, the residual product obtained was a somewhat brittle reddish sticky mass. Its aqueous solution was very foamy and soapy. When neutralized with dilute potassium hydroxide, it gave a solution having marked wetting-out properties for cotton.

In another experiment the above quantity of 1,10-decamethylene glycol used was cut in half. The product was in general, similar in its physical properties to the preceding one, but was somewhat harder.

*Condensate "A" and 1,12-octadecanediol.*—15 grams condensate "A" in 100 grams toluene was converted by means of 10 grams 98% sulfuric acid at 25–35° C. into the amine sulfate. 28.5 grams 1,12-octadecanediol (from the catalytic hydrogenation of castor oil) was added and the mixture was boiled with stirring under reflux until 2 cc. water had come over in the automatic water separator. The clear solution obtained was evaporated to dryness on steam bath at 12 mm. The residual product was a viscous, colorless waxy mass. Its aqueous solution forms a good detergent.

*Condensate "A" and oleyl alcohol.*—The proportions used were:
  15 grams condensate "A" in 75 grams toluene
  10 grams 98% sulfuric acid
  26.8 grams oleyl alcohol The amine salt was first prepared at 20–30° C. The oleyl alcohol was then added and mixture was boiled 1½ hours as described above. The solvent was then removed in vacuo on steam bath.

The product was a pale reddish viscous oily mass. Its aqueous solution was very foamy and soapy. When neutralized with triethanolamine it gave a soap having good detergent properties.

*Condensate "A" and cetyl alcohol.*—The proportions used were:
  15 grams condensate "A" in 75 grams toluene
  10 grams 98% sulfuric acid
  25 grams cetyl alcohol The condensation and working up of the product were similar to that above. The product was a viscous waxy mass. It may be used as a soap.

*Condensate "A" and $\alpha,\alpha,\gamma,\gamma$-tetramethyl-butyl-phenoxy-ethanol.*—The proportions used were:

38 grams condensate "A" in 100 grams toluene neutralized with 25 grams 98% sulfuric acid at 25–35° C. 62.5 grams $\alpha,\alpha,\gamma,\gamma$-tetramethyl-butyl-phenoxy-ethanol

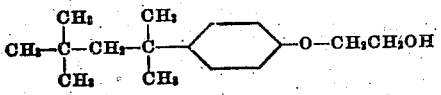

and the mixture boiled under reflux using automatic water separator until a clear solution was obtained. The time required was 1½–2 hours. The toluene was then distilled off in vacuo on steam bath. Product was a viscous solid. Its aqueous solutions foam strongly when shaken. It may be used as a soap.

*Example 2.—Condensate "B" and lauryl alcohol*

A solution of 41 grams condensate "B" in 100 grams dioxane was converted into its sulfate by means of 25 grams 96% sulfuric acid at 20–35° C. To the solution obtained, 46 grams lauryl alcohol was added. The mixture was boiled at 110–120° C. for two hours under reflux. The dioxane was then distilled off on the steam bath under reduced pressure, leaving the residual condensation product as a pale reddish, viscous oil. It was readily soluble in toluene or water. Its aqueous solution was foamy and precipitated gelatine. Upon neutralization of the aqueous solution with dilute caustic soda a clear solution possessing high wetting and detergent properties was obtained.

*Condensate "B" and cetyl alcohol.*—The proportions used were:
  41 grams condensate "B" (made from meta-para-cresol mixture: b. p. 110–125° C./10 mm.)
  100 grams toluene
  25 grams 96% sulfuric acid
  25 grams cetyl alcohol The reagents were mixed in the order shown as described above. The mixture was boiled with stirring for two hours so that the water formed was separated and the toluene which distilled off was continuously replaced. Upon removal of the toluene in vacuo, the residual product was a viscous somewhat waxy mass the aqueous solution of which is soapy. Upon neutralization with ammonia it gave a good detergent.

*Example 3.—Condensate "C" and lauryl alcohol*

The proportions used were:
  179 grams condensate "C" in 200 grams toluene
  100 grams 98% sulfuric acid
  186 grams lauryl alcohol The reagents were mixed in the order shown at 25–40° C. The mixture was boiled 1½–2 hours as described in Example 1. After removal of the solvent, the residual product was a pale reddish sticky balsam. Its aqueous solution foams strongly when shaken and can be used as an acidic detergent, or the solution can be neutralized with sodium carbonate for use on cotton.

*Example 4.—Condensate "D" and lauryl alcohol*

The proportions used were:
  186 grams condensate "D" in 225 grams toluene
  100 grams 98% sulfuric acid
  186 grams lauryl alcohol The reagents were mixed in the order shown at 25–40° C. and the mixture boiled 1½–2 hours as described above. The product obtained after removal of the solvent was a soft viscous resin. Its aqueous solution is a germicidal soap.

*Example 5.—Condensate "E" and lauryl alcohol*

The hydrochloride of condensate "E" was prepared by passing dry hydrogen chloride into an ether solution of the base. It was filtered off and dried. The hydrochloride was a colorless crystalline substance.

A mixture of 15 grams of this hydrochloride and 9 grams of lauryl alcohol was heated under reflux in an oil bath at 160–165° C. for 1½–2 hours. A clear colorless oil formed, which gradually solidified to a waxy, crystalline mass. It was readily soluble in water to give a foamy, soapy solution having very high bactericidal power.

*Condensate "E" and glycerol.*—A mixture of 15 grams of the hydrochloride of condensate "E" and 5 grams of glycerol was heated under reflux at 160–170° C. for two hours. The product obtained dissolved in water to give a foamy, soapy solution.

*Condensate "E" and diethylene glycol.*—To a solution of 26.3 grams condensate "E" in 100 cc. toluene there was added 11 grams 98% sulfuric acid, while stirring and cooling to 20–25° C. The complex phenolic amine sulfate separates as a sticky mass. To the mixture there was added 10.6 grams diethylene glycol. The mixture was then boiled under reflux for 1½ hours so that the water which formed distilled off while the toluene was continuously returned to the reaction vessel. Two layers were formed, the upper being toluene. The lower layer was run off and dried in vacuo at 90–100° C. It formed a viscous reddish mass which dissolved readily in water to a soapy solution.

*Condensate "E" and ethyl alcohol.*—To 26.3 grams condensate "E" there was added at 5–10° C. with stirring 10 grams 98% sulfuric acid and then 10 grams absolute alcohol. The mixture was heated on steam bath at 90–100° C. for 3 hours. The clear reddish solution obtained was evaporated to dryness in vacuo on steam bath. The residue was a reddish brittle amorphous mass. A 5% solution thereof in water is clear and can be used as a wetting-out agent. By neutralization with triethanolamine, a water-soluble salt is obtained having high bactericidal power.

*Example 6.—Condensate "F" and lauryl alcohol*

30.3 grams condensate "F" was dissolved in 100 cc. dioxane and converted to its sulfate by means of 11 grams 98% sulfuric acid. Lauryl alcohol (18.6 grams) was then added. The mixture was boiled under reflux for two hours. The solvent was then removed by distillation in vacuo on a steam bath. The residue was a viscous oil which dissolved in water to a foamy soapy solution.

In place of the lauryl alcohol there can be used respectively, 0.1 mol. equivalent of n-octanol, n-butanol, glycerol, or alpha-ethyl-n-hexanol to yield similar condensation products.

*Example 7.—Condensate "G" and lauryl alcohol*

22.7 grams condensate "G" (melting point 112–113° C.) in 100 cc. toluene was treated with 10.5 grams 98% sulfuric acid at 20–25° C. Lauryl alcohol (18.6 grams) was then added and the mixture boiled for 1½ hours under reflux so that water which formed was automatically separated. Upon evaporation of the solvent in vacuo, a viscous mass was obtained. Its aqueous solution foams strongly when shaken, and is a powerful antiseptic.

In place of the condensate "G", melting point 112–113° C. the isomeric product, melting point 90° C. made from para-phenylphenol was used in the same manner. The product was an amorphous mass, readily soluble in water.

The lauryl alcohol can be replaced by molecularly equivalent amounts of cetyl, oleyl, octadecyl or n-octyl alcohol to give analogous condensation products.

*Example 8.—Condensate "H" and lauryl alcohol*

The proportions used were:
20.1 grams condensate "H" in 100 cc. toluene
10.5 grams 98% sulfuric acid
18.6 grams lauryl alcohol.

The complex phenolic amine "H" was first converted to the sulfate at 20–30° C. Then the mixture was boiled 1½ hours under reflux. Upon removal of the solvent, a reddish viscous mass was obtained. Its aqueous solution foams readily when shaken.

The lauryl alcohol can be replaced by 0.1 mol. respectively of n-octyl, cetyl, or oleyl alcohol to give analogous soapy products.

*Example 9.—Condensate "I" and lauryl alcohol*

The proportions used were:
28.5 grams condensate "I" in 100 cc. dioxane
11 grams 98% sulfuric acid
18.6 grams lauryl alcohol.

The sulfate of the base was boiled 2½ hours under reflux with the toluene solution of the lauryl alcohol. Upon removal of the solvent in vacuo a reddish mass was obtained which in aqueous solution gives soap-like foamy solutions capable of precipitating gelatine.

The lauryl alcohol can be replaced by 0.1 mol. respectively of n-butanol, alpha-ethyl hexanol, or glycerol to yield water-soluble, glue precipitating condensation products.

*Example 10.—Condensate "J" and lauryl alcohol*

To a solution of 19.3 grams condensate "J" in 75 cc. toluene, 10.3 grams 98% sulfuric acid was added with cooling at 20–30° C. Then 18.6 grams lauryl alcohol was added. The mixture was boiled for 1½ hours under reflux with stirring so that the water formed was continuously removed while the toluene was returned to the flask. The clear solution was evaporated to dryness in vacuo. The residue was a pale soap-like mass. Its aqueous solution is a good wetting-out agent. When neutralized with caustic soda, the solution is a good detergent.

In the above examples, certain deviations may be made without departing from the spirit of the invention such for example as using a mixture of alcohols, or a mixture of phenols or a mixture of the secondary amines. The temperatures may be adjusted to meet the particular requirements which may vary somewhat with the nature of the salt or of the alcohol used. The phenols used do not necessarily have to be pure; the crude products known as tar acids or cresylic acids may be used for producing cheap germicidal compounds of the type described. The term "phenol" as employed broadly herein refers to both monocyclic or polycyclic phenols containing one or more phenolic hydroxyl groups. Many of the fusible, soluble "Novolack" resins made from phenol or cresol and formaldehyde are soluble in dilute caustic soda and are therefore phenols and can be used as such for the purpose of this invention if condensed with additional formaldehyde and the secondary amine; then converted to the sulfate or hydrochloride and condensed with an alcohol.

Although the preferred phenols and secondary amines used are those set forth specifically herein, nevertheless the reaction is applicable to all phenols and aliphatic or alicyclic secondary amines which are free from acidic groups.

The water-soluble products obtained by the present process contain phenolic hydroxyl groups and possess the typical properties of phenols. They all precipitate gelatine more or less when in the acidified form. They may be used in washing, bucking, tanning, mordanting and dyeing operations; in hydrolyzing fats to fatty acids and glycerine; for emulsifying oils or fats in water; for breaking petroleum emulsions; for dispersing pigments and dyestuffs; for additions to soaps or pine oil to increase the germicidal power thereof; and for wetting-out cotton, wool or silk in dyeing, bleaching or scouring operations.

What we claim is:

1. A process for preparing phenolic water-soluble compounds, which comprises heating reacting proportions of an alcohol which contains a primary alcoholic hydroxyl group, with a member of the group consisting of the hydrohalide and sulfuric acid salts of complex phenolic amines obtained by the intercondensation of a phenol with at least molecularly equivalent quantities each of formaldehyde and a secondary amine of the formula X—NH—X$_1$ wherein X and X$_1$ are each alkyl or ring methylene groups; said heating being carried out at a temperature capable of effecting the splitting off of water from the reaction mixture.

2. A process for preparing phenolic water-soluble compounds, which comprises heating reacting proportions of a primary monohydric alcohol with a member of the group consisting of the hydrohalide and sulfuric acid salts of complex phenolic amines obtained by the intercondensation of a phenol with at least molecularly equivalent quantities each of formaldehyde and a secondary amine of the formula X—NH—X$_1$ wherein X and X$_1$ are each alkyl or ring methylene groups; said heating being carried out at a temperature capable of effecting the splitting off of water from the reaction mixture.

3. A process for preparing phenolic water-soluble compounds, which comprises heating reacting proportions of a primary polyhydric alcohol with a member of the group consisting of the hydrohalide and sulfuric acid salts of complex phenolic amines obtained by the intercondensation of a phenol with at least molecularly equivalent quantities each of formaldehyde and a secondary amine of the formula X—NH—X$_1$ wherein X and X$_1$ are each alkyl or ring methylene groups; said heating being carried out at a temperature capable of effecting the splitting off of water from the reaction mixture.

4. A process for preparing phenolic water-soluble compounds which comprises heating reacting proportions of a primary fatty alcohol having more than seven carbon atoms with a member of the group consisting of the hydrohalide and sulfuric acid salts of complex phenolic amines obtained by the intercondensation of a phenol with at least molecularly equivalent quantities each of formaldehyde and a secondary amine of the formula X—NH—X$_1$ wherein X and X$_1$ are each alkyl or ring methylene groups; said heating being carried out at a temperature capable of effecting the splitting off of water from the reaction mixture.

5. A process for preparing phenolic water-soluble compounds, which comprises heating reacting proportions of a primary fatty alcohol having more than seven carbon atoms with the sulfuric acid salt of a complex phenolic amine obtained by the intercondensation of substantially one molecular equivalent each of a phenol, formaldehyde and dimethylamine; said heating being carried out at a temperature capable of effecting the splitting off of water from the reaction mixture.

6. A process for preparing phenolic water-soluble compounds, which comprises heating substantially one molecular equivalent of a primary aliphatic monohydric alcohol having more than seven carbon atoms with the sulfuric acid salt of a complex phenolic amine obtained by the intercondensation of substantially one molecular equivalent each of a phenol, formaldehyde and dimethylamine; said heating being carried out at a temperature capable of effecting the splitting off of water from the reaction mixture.

7. A process for preparing phenolic water-soluble compounds, which comprises heating substantially one molecular equivalent of a primary aliphatic monohydric alcohol having more than seven carbon atoms with the sulfuric acid salt of a complex phenolic amine obtained by the intercondensation of substantially one molecular equivalent each of phenol, formaldehyde and dimethylamine; said heating being carried out at a temperature capable of effecting the splitting off of water from the reaction mixture.

8. A process for preparing phenolic water-soluble compounds which comprises heating substantially one molecular equivalent of lauryl alcohol with the sulfuric acid salt of a complex phenolic amine obtained by the intercondensation of substantially one molecular equivalent each of a phenol, formaldehyde and dimethylamine; said heating being carried out at a temperature capable of effecting the splitting off of water from the reaction mixture.

9. A process for preparing phenolic water-soluble compounds which comprises heating substantially one molecular equivalent of lauryl alcohol with the sulfuric acid salt of a complex phenolic amine obtained by the intercondensation of substantially one molecular equivalent each of phenol, formaldehyde and dimethylamine; said heating being carried out at a temperature capable of effecting the splitting off of water from the reaction mixture.

10. A process for preparing phenolic water-soluble compounds which comprises heating substantially one molecular equivalent of lauryl alcohol with the sulfuric acid salt of a complex phenolic amine obtained by the intercondensation of substantially one molecular equivalent each of cresol, formaldehyde and dimethylamine; said heating being carried out at a temperature capable of effecting the splitting off of water from the reaction mixture.

11. A water-soluble condensation product of (1) an alcohol containing a primary alcohol group, and (2) a member of the group consisting of the hydrohalide and sulfuric acid salts of complex phenolic amines obtained by the intercondensation of a phenol with at least molecular equivalent quantities each of formaldehyde and a secondary amine of the formula X—NH—X$_1$ wherein X and X$_1$ are each alkyl or ring methylene groups.

12. A water-soluble condensation product of (1) a primary monohydric alcohol and (2) a member of the group consisting of the hydrohalide and sulfuric acid salts of complex phenolic amines obtained by the intercondensation of a phenol with at least molecular equivalent quantities each of formaldehyde and a secondary amine of the formula X—NH—X$_1$ wherein X and X$_1$ are each alkyl or ring methylene groups.

13. A water-soluble condensation product of (1) a primary polyhydric alcohol and (2) a member of the group consisting of the hydrohalide and sulfuric acid salts of complex phenolic amines obtained by the intercondensation of a phenol with at least molecular equivalent quantities each of formaldehyde and a secondary amine of the formula X—NH—X₁ wherein X and X₁ are each alkyl or ring methylene groups.

14. A water-soluble condensation product of (1) a primary fatty alcohol having more than seven carbon atoms and (2) a member of the group consisting of the hydrohalide and sulfuric acid salts of complex phenolic amines obtained by the intercondensation of a phenol with at least molecular equivalent quantities each of formaldehyde and a secondary amine of the formula X—NH—X₁ wehein X and X₁ are each alkyl or ring methylene groups.

15. A water-soluble condensation product of (1) a primary fatty alcohol having more than seven carbon atoms and (2) the sulfuric acid salt of a complex phenolic amine obtained by the intercondensation of substantially one molecular equivalent each of a phenol, formaldehyde and dimethylamine.

16. A water-soluble condensation product of (1) a primary aliphatic monohydric alcohol having more than seven carbon atoms and (2) a sulfuric acid salt of the complex phenolic amine obtained by the intercondensation of substantially one molecular equivalent each of phenol, formaldehyde, and dimethylamine.

17. A water-soluble condensation product of (1) lauryl alcohol and (2) a sulfuric acid salt of the complex phenolic amine obtained by the intercondensation of substantially one molecular equivalent each of a phenol, formaldehyde, and dimethylamine.

18. A water-soluble condensation product of (1) lauryl alcohol and (2) a sulfuric acid salt of the complex phenolic amine obtained by the intercondensation of substantially one molecular equivalent each of phenol, formaldehyde, and dimethylamine.

19. A water-soluble condensation product of (1) lauryl alcohol and (2) a sulfuric acid salt of the complex phenolic amine obtained by the intercondensation of substantially one molecular equivalent each of cresol, formaldehyde, and dimethylamine.

20. A water-soluble condensation product of (1) lauryl alcohol and (2) a sulfuric acid salt of the complex phenolic amine obtained by the intercondensation of substantially one molecular equivalent each of phenylphenol, formaldehyde, and dimethylamine.

HERMAN A. BRUSON.
OTTO STEIN.